Feb. 18, 1947.   H. W. JONES ET AL   2,415,886
SEMI-AUTOMATIC ELECTRICAL TIMING APPARATUS
Filed July 14, 1943
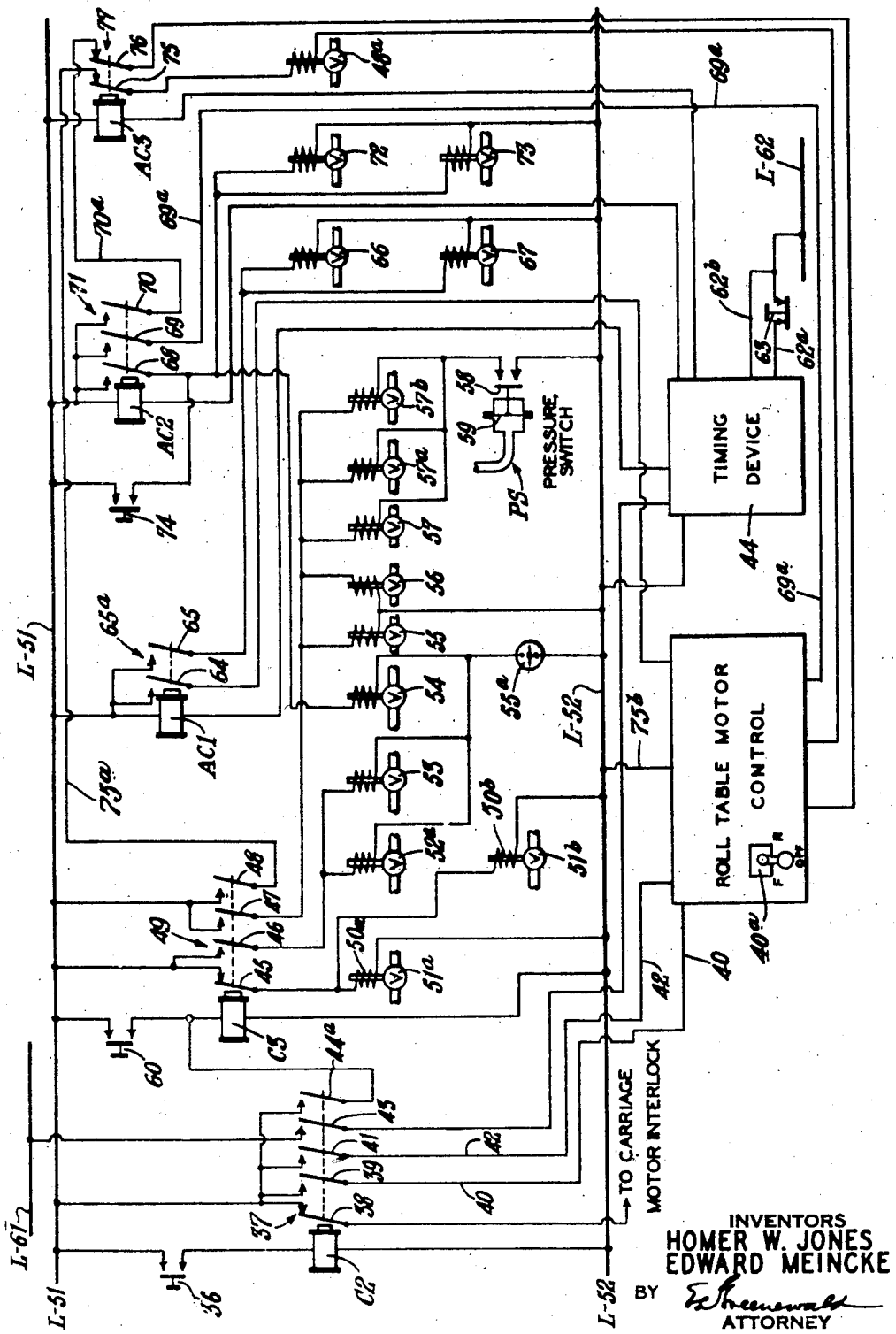
INVENTORS
HOMER W. JONES
EDWARD MEINCKE
BY
ATTORNEY Patented Feb. 18, 1947

2,415,886

UNITED STATES PATENT OFFICE 2,415,886

SEMIAUTOMATIC ELECTRICAL TIMING APPARATUS

Homer W. Jones, Westfield, and Edward Meincke, Scotch Plains, N. J., assignors to The Linde Air Products Company, a corporation of Ohio Application July 14, 1943, Serial No. 494,630

3 Claims. (Cl. 161—1)

This invention relates to timing apparatus and more particularly to semi-automatic electrical control therefor. The invention is particularly adapted for application to various mechanisms or machines employing blowpipe devices for conditioning ferrous metal bodies and the principles of the invention will be described as applied to a machine for thermochemically desurfacing the four sides of a square billet. Such a machine has been described and claimed in United States Letters Patent 2,276,329, issued on March 17, 1942, to Alfred J. Miller, James H. Bucknam and William C. Weidner, and a system of remote control for such blowpipe machines has been disclosed and claimed in United States Letters Patent 2,244,822 issued June 10, 1941, to James H. Bucknam.

As detailed in said United States Patent 2,244,822, the sequence of essential events or steps in the operation of a machine for thermochemically removing metal from steel bodies, is as follows: 1, the body must be moved into position for beginning the operation; 2, the blowpipe heads of the machine are moved into position adjacent the surfaces to be conditioned; 3, the flow of heating gases is started, the gases ignited and the flames applied for a sufficient time to heat the surface to the ignition temperature; 4, the oxidizing gas is caused to flow and the body moved relatively to the blowpipe heads to remove metal; and 5, when the end of the surface is reached the gases are promptly shut off and the machine is prepared for operation on the next steel body to be conditioned.

Heretofore, in ordinary practice the various controls for commencing the above events have not been automatically correlated, with the result that an operator could erroneously commence the operation identified above as, for example, No. 3, before the start or completion of operation No. 1, or other sequence of steps. Therefore it was possible for unskilled operators to commit serious errors which might damage the apparatus or spoil the work. However, that system of control for such blowpipe machines suggested in Bucknam United States Patent 2,244,822 issued June 10, 1941, involves a multi-circuit sequence control system which permits the controlling of the operation of a surface conditioning, desurfacing or cutting machine by a single operator who controls the operation from a remote location, by means of a drum control which latter normally prevents the operator from performing the essential events, referred to above, in improper sequence; but the timing of the various phases or steps has been left entirely to the discretion of the operator. Thus, it can be seen that the preheat time and precise timing of the various phases of operation may be inaccurate because of the operator's inability to judge the exact time necessary for each phase of the desurfacing cycle. However, inasmuch as there are a number of variables which enter into the desurfacing process such as the varying temperatures of the bars, roll table speed, the gas pressures, and the length of the bars, it is obvious that no exact time interval can be set up as a standard for each step of the desurfacing or other operation.

Accordingly, this invention has for its principal object the provision of an electrical system for controlling the sequence and duration of the various steps of operation of a surface conditioning, desurfacing or like apparatus for thermochemically removing layers of metal from metal bodies, such that manual initiation of such operation is followed by an entire sequence of steps which are progressively initiated and carried out automatically in accord with an electrical timing mechanism, which latter may be adjusted so that the amount of time devoted to individual steps may be varied, the said electrical control system also including a time delay means which permits an operator, at his option, to lengthen the period of operation of any particular step, by temporarily cutting out the timing mechanism, the latter being of such nature that the same can be cut in again without otherwise interfering with its operation.

Other objects are: to provide a central single control for automatically controlling the sequence and timing of all of the desurfacing operations of a steel billet or slab conditioning machine; to provide automatically operable interlocks between the desurfacer carriage and the rolls of the roll table conveyor of said billet or slab thereby to prevent movement of the former after the scarfing cycle has commenced; to provide an electrical system which is simple, economical and efficient and so arranged that all operations of the conditioning apparatus must occur in proper sequence and at properly timed intervals, thus avoiding waste of industrial gases and inefficient operation of the machine.

With the above and other objects in view our invention will be readily understood from an illustrative embodiment thereof hereinafter described in conjunction with the accompanying drawing.

The single figure of the drawing is a schematic and simplified wiring diagram exemplifying the invention.

Assuming that the type of auxiliary apparatus disclosed in said Miller, et. al. Patent No. 2,276,329 is present and is functioning properly, and that all line disconnect switches are closed, a manually operated start push button 36 is depressed and held down during the complete scarfing, or metal conditioning cycle. This energizes a main multi-contact scarfing relay C2 by closing the main control circuit between direct current line L—51 and line L—52. Energizing relay C2 operates all of the contacts of the five pole switch 37, with the results that: (1) opening the contact 38 which in turn opens a circuit leading to a carriage motor in a carriage, thereby preventing any transverse movement of the machine by interlocking same while further scarfing operations are in progress; (2) closing the contact 39 which in turn closes a circuit through line 40 to the roll table motor control to prevent any motion of the roll table due to control exercised through a mill master switch 40a; (3) closing the contact 41 which in turn closes a circuit through wire 42 to the roll table motor control, thereby shunting certain ordinary mill roll table electrical controls to equivalent circuits except that the latter include the type of limit switches operative by passage of the slab which are described in Bucknam United States Patent No. 2,244,822, above referred to; (4) closing the contact 43 which in turn closes a circuit between alternating current line L—61 and line L—62, which energizes a timing device 44; (5) closing the contact 44a which in turn energizes a relay C3 which opens contact 45 and closes contacts 46, 47 and 48 of the four pole switch 49.

Opening the contact 45 de-energizes the solenoids 50a and 50b with the result that the desurfacing heads or units are conditioned for movement and may, upon operation of other devices to be later described, move in and around towards the slab due to the fact that the solenoid operated valves 51a and 51b are closed, thus releasing pressure which otherwise tends to keep the blowpipe units in "out" position. Contact 46 controls solenoid operated valves 52a and 53, which valves respectively control nozzle selector valves which supply preheat acetylene, and preheat oxygen, to additional blocks of nozzles in the desurfacing heads, which blocks may be necessary where large slabs are to be processed. The nozzle selector valves are generally similar to those described and claimed in United States application for patent Serial No. 414,086 filled October 8, 1941, by J. H. Bucknam, E. Meincke and L. W. Young and in the present instances the selector valves are operated by solenoids. The additional blocks of nozzles can also be manually placed in operation, or not, at the discretion of the operator, by closing a snap switch 55a as desired. The snap switch 55a can be replaced by automatically operating side guide limit switches. Contact 47 when closed in turn closes the circuits controlling the solenoid operated valves 55, 56, 57, 57a and 57b. Opening valve 55 lowers the left hand blowpipe unit and the solenoid operated valve 56 raises the right hand blowpipe unit, whereas the solenoid operated valve 57 through appropriate controls moves the desurfacing heads horizontally inwardly into contact with the sides of the slab. Valves 57a and 57b turn on preheat acetylene and oxygen in the blowpipe units. These operations will normally be preferably performed generally as described in said Bucknam United States Patent No. 2,244,822 and therefore details of the same will not be here given.

As indicated, the circuit controlling the solenoid operated valves 57 and preheat oxygen and acetylene valves 57a and 57b also includes a hydraulic pressure operated switch PS which is normally held closed by virtue of hydraulic pressure exerted against its diaphragm control 59. By means of switch 58 the circuit controlling valve 57 may be broken and the preheat gases turned off if the necessary water pressure for cooling the desurfacing heads is not present in the circulation system.

Auxiliary to contact 44a which controls the operation of relay C3 only after the closing of starting switch 36, it has been arranged by means of the purge switch button 60 to directly energize relay C3 from line L—51, thus shunting contact 44a. The purging operation permits the testing of the preheat units after moving the nozzle selector valve into position for providing gas to the desired number of nozzles in each head as above described by means of solenoid operated valves 52a, and 53.

Contact 48 of switch 49 is closed when relay C3 is energized and closes a circuit 75a running to the pinch roll control 48a.

It will be understood that the electrical timing device 44 is a conventional electrical timer of the type that sequentially closes electrical circuits at time intervals which are adjustable and predetermined. One such conventional device termed the "Multiflex" timer is manufactured by the Eagle Signal Corporation and embodies a plate like member which is progressively moved downwardly by a timing device operated synchronously by alternating current. The plate like member, as it progresses, sequentially closes, after the elapse of predetermined but variable time intervals, a series of electrical switches. A time delay push button 63 and a related clutch assembly is interposed in wire 62a to the alternating current line L—62 for interrupting movement of the plate like member of the timing device 44. When contact 43 is again open as when push button 36 is released, the circuits established through wires 62a and 62b are broken, and the plate member is returned to original position by spring pressure. When the time delay push button 63 is depressed, the movement of the plate like member is stopped, without however opening any of the electrical circuits previously closed by the said timing device. This permits lengthening any particular timing interval in the discretion of the operator by depressing the said time delay switch push button 63. An appropriate mechanical or electronic timer can be substituted for timer 44, and the two can be made readily interchangeable, if desired.

After the expiration of the first timing interval, as determined by the timing device 44, relay AC1 is energized, thereby closing the contacts 64 and 65 respectively of the switch 65a.

Closing contact 64 closes a circuit to energize a relay in the roll table motor control which partially governs the accelerating timer of the roll table motor, thus to increase the starting torque of the latter motor so that the billet is started quickly.

Closing the contact 65 in turn closes a circuit opening the solenoid controlled valve 66 which turns on the slag removal water along conventional lines insofar as said metal conditioning machines are concerned, and also closes the circuit which operates solenoid controlled valve 67, and the latter valve is so arranged that the units press inwardly against the slab at predetermined lower oil pressures, thus avoiding the higher oil pressures necessary to move the units inwardly at high speed, but giving sufficient pressures so that the units closely follow the surfaces of the slab.

After the expiration of a second timing interval, allowing slag water to flow and the reduction of oil pressure to occur, as determined by the timing device 44, relay AC2 is energized thereby closing contacts 68, 69 and 70 respectively of the three pole switch 71.

Closing contact 68 in turn closes the circuits opening solenoid controlled stop valves 54, 72 and 73; these valves apply cutting oxygen to the blowpipe units.

An oxygen purging push button 74 may be operated to close a circuit operating valves 54, 72 and 73, thus shunting such circuit operable by relay AC2. This permits testing or purging the oxygen delivery of the blowpipe units without operating the other elements of the machine.

Closing contact 69 in turn closes a circuit through line 69a connected to the roll table motor control which operates to supply current to the latter as a unit.

Closing contact 70 in turn closes the circuit connected through line 70a to the roll table motor control which operates to cause a forward motion of the rolls thereof, thus advancing the slab through the desurfacer machine at the proper speed.

Since the preheat time for raising a portion of the slab to ignition temperature has elapsed and since the cutting oxygen is turned on, the slab is conditioned by removing surface portions thereof by progressive reaction with cutting oxygen during relative movement between the slab and the desurfacing units delivering the cutting oxygen.

After the expiration of a third timing interval, long enough for the slabs to enter the rolls of the mill stand positioned after the desurfacing machine, as determined by the timing device 44, relay AC3 is energized thereby opening contacts 75 and 76 respectively of the two pole switch 77.

Opening contact 75 breaks the circuit of line 75a originally established by the closing of contact 48 of switch 49, thereby causing the pinch roll to raise to initial or retracted position. Current passing through lines 75a and other lines which enter the roll table motor control and need to be connected to line L—52, may pass through line 75b.

Opening contact 76 of the switch 77 breaks the circuit originally established by contact 70 of three pole switch 71, thus opening the roll table motor circuit and freeing the rolls of the roll table and also by appropriate controls restoring control of the roll table to the mill master switch 40a.

In the present instance, the machine is understood to be positioned adjacent a mill stand, which will continue by its rolls to advance the slab after the roll table rolls have been discontinued by throwing out contact 76 as described.

However, it also will be understood, that at times, the positive driving of the rolls of the roll table will be continued while the slab is advanced through the machine, and that therefore contact 76 and its circuits will not be provided in the electrical controls as described.

Restoration of the roll table controls to the mill master switch after the elapse of the third timing interval permits the operator to undertake steps, by reversing or advancing the inlet roll table, to bring another slab up to the desurfacing machine and particularly to prevent any following bar from hitting the machine concurrently with the desurfacing operation upon the slab already in the machine; the two operations, i. e. reversing the rolls or advancing the rolls, and advancing the slab in the machine are not therefore, mutually exclusive.

Immediately after desurfacing of the slab within the machine as indicated to the operator by the trailing end of the slab approaching the blowpipe units, the operator will release the pressure on the start push button 36, at which time it is arranged for the following operations to occur simultaneously due to a breaking of the circuits above described and the resultant appropriate closing or opening of solenoid controlled valves which are no longer energized: (1) the units retract horizontally at high oil pressure; (2) the units retract vertically at preset air pressure; (3) the preheat oxygen, acetylene, the cutting oxygen and slag water are turned off; (4) the timing device is reset by a spring control which is an integral part of the same; (5) full control of the roll table is restored to the mill master switch; (6) the carriage control is restored.

Various changes and modifications of the invention may be employed, but it is to be understood that the invention is not to be limited to what is described in the specification and shown in the drawing but only as indicated in the appended claims.

We claim:

1. In a machine comprising a plurality of elements the operating sequence and normal periods of operation of which are automatically controlled by a timing device, a control circuit including means for energizing and operating said timing device, and auxiliary delay means controlling the effective operation of said timing device so as to increase at will the period of operation of any selected one of such elements during the operation of the machine and without affecting any subsequent normal operation of the timing device or machine, means for restoring said elements to initial condition when said control circuit is deenergized, and means for energizing said control circuit comprising a main control switch.

2. In a machine comprising a plurality of elements the operation of which is controlled by a timing device, a control circuit comprising a first source of supply current, a first relay, a switch to connect said relay to said supply current source, means biasing said switch to "off" position so that it must be held in "on" position to effect continued operation of the machine, said relay including at least two contacts, a second source of supply current, one of said contacts being adapted when operated to connect said timing device to said second supply current source, a second relay for operating one of said elements, another contact of said first relay being adapted when operated to connect said second relay to said first supply current source, so that said timing device and such element are simultaneously energized, a plurality of relays adapted to be connected in sequence by said timing device to said first supply current source after suitable time intervals for operating other elements of the machine, and a time delay switch in the supply current energizing circuit of said timing device for increasing at will an interval of said timing device during the operation of the machine.

3. In a machine of the class described comprising a plurality of elements the operations of which are controlled by a timing device, a control circuit comprising a first relay, a switch to connect said relay to a supply current source, said switch being normally open so that it must be closed to effect continued operation of the machine, said relay including at least two contacts, one of said contacts being adapted when operated to connect said timing device to a supply current source, a second relay for operating one of said elements, another contact of said first relay being adapted when operated to connect said second relay to a supply current source, so that said timing device and such element are simultaneously energized, a plurality of relays adapted to be connected in sequence by said timing device to a supply current source after suitable time intervals for operating other elements of the machine, and a time delay switch in the supply current energizing circuit of said timing device for increasing an interval of said timing device during the operation of the machine.

HOMER W. JONES.
EDWARD MEINCKE.

REFERENCES CITED

The following references are of record in the file of this patent:

UNITED STATES PATENTS

| Number | Name | Date |
| --- | --- | --- |
| 1,585,893 | Coberly | May 25, 1926 |
| 2,244,822 | Bucknam | June 10, 1941 |
| 2,276,329 | Miller et al. | Mar. 17, 1942 |
| 2,208,607 | Somes | July 23, 1940 |
| 1,795,013 | Denman | Mar. 3, 1931 |
| 2,290,626 | Bosomworth | July 21, 1942 |